United States Patent [19]

Argyroudis et al.

[11] Patent Number: 5,748,104
[45] Date of Patent: May 5, 1998

[54] WIRELESS REMOTE TELEMETRY SYSTEM

[75] Inventors: Panayotis Argyroudis; Gwain Bayley, both of San Diego; Matthew S. Grob, La Jolla; Marc Phillips; Samir S. Soliman, both of San Diego, all of Calif.

[73] Assignee: Qualcomm Incorporated, San Diego, Calif.

[21] Appl. No.: 682,819

[22] Filed: Jul. 11, 1996

[51] Int. Cl.⁶ .................................................. G08C 19/04
[52] U.S. Cl. ........................... 340/870.11; 340/870.02; 379/106; 370/320
[58] Field of Search ...................... 340/870.02, 870.03, 340/870.11, 870.12, 825.44, 311.1; 329/107, 106; 370/324, 335, 342, 320

[56] References Cited

U.S. PATENT DOCUMENTS

| | | | |
|---|---|---|---|
| 4,204,195 | 5/1980 | Bogacki | 340/870.03 |
| 4,357,601 | 11/1982 | McWilliams | 340/506 |
| 4,388,690 | 6/1983 | Lumsden | 364/483 |
| 4,540,849 | 9/1985 | Oliver | 379/106.07 |
| 4,578,536 | 3/1986 | Oliver et al. | 379/106.07 |
| 4,641,322 | 2/1987 | Hasegawa | 375/200 |
| 4,804,938 | 2/1989 | Rouse et al. | 340/310.06 |
| 4,811,011 | 3/1989 | Sollinger et al. | 340/870.02 |
| 4,815,106 | 3/1989 | Propp et al. | 375/257 |
| 4,850,010 | 7/1989 | Stanbury et al. | 379/106.06 |
| 4,856,047 | 8/1989 | Saunders | 340/825.44 |
| 4,866,733 | 9/1989 | Morishita et al. | 375/200 |
| 4,866,761 | 9/1989 | Thornborough | 375/200 |
| 5,025,470 | 6/1991 | Thornborough et al. | 340/870.3 |
| 5,090,024 | 2/1992 | Vander May et al. | 375/204 |
| 5,377,222 | 12/1994 | Sanderford | 370/324 |
| 5,451,937 | 9/1995 | Olson et al. | 370/329 |
| 5,481,546 | 1/1996 | Dinkins | 370/329 |
| 5,506,404 | 4/1996 | Milan-Kamski | 340/870.28 |
| 5,523,559 | 6/1996 | Swanson | 250/227.1 |
| 5,544,036 | 8/1996 | Brown | 340/311.1 |
| 5,594,740 | 1/1997 | Ladue | 379/59 |

Primary Examiner—Jeffery Nofsass
Assistant Examiner—Albert K. Wong
Attorney, Agent, or Firm—Russell B. Miller; Roger W. Martin

[57] ABSTRACT

A wireless remote telemetry system which uses low-cost remote communication devices operating on existing wireless communication systems in order to provide real-time reading and control of remote devices. In an embodiment applicable to utility service, consumption of electrical power among a population of customers is measured by a utility metering system having a wireless communication capability. The metering system comprises a remote metering unit which communicates with a central controller over existing wireless communication systems, such as cellular base stations, using existing communication standards. The remote metering unit transmits various messages over a shared random access channel to a central controller. The central controller transmits messages to the remote metering unit over a paging channel. The remote metering unit may operate in a half-duplex mode only. Furthermore, the remote metering unit may provide a gateway to advanced consumer services at the remote location.

19 Claims, 2 Drawing Sheets

WIRELESS REMOTE TELEMETRY SYSTEM

BACKGROUND OF THE INVENTION

I. Field of the Invention

The present invention relates generally to wireless communications. More particularly, the present invention is directed to a novel and improved method and apparatus for the wireless metering of remote measurement devices.

II. Description of the Related Art

Many industries utilize remote metering devices to monitor, measure, or record critical data. For example, utility companies use utility meters located at the customer site to measure utility consumption. The deregulation of utility companies, such as electric power, water, and natural gas companies, has prompted these utility companies to seek technological modernization of equipment and services as a means of reducing costs in order to compete with other potential utility service providers.

In a conventional utility metering system, each utility customer is billed according to utility usage over a predetermined period of time, such as one or two months. The utility usage is measured by an electro-mechanical meter having a visual display such as a set of dials, or an "odometer" type display. A person, typically an employee of the utility company, periodically visits each utility meter in a service area to visually read the utility consumption as reported by the meter.

Several inefficiencies exist in conventional utility metering system. For example, the utility company must pay a person to travel to each meter to visually read it. This may require sending the meter reader into a dangerous area. It also takes a long time for a person to physically visit each meter. Additionally, most electro-mechanical meters may be opened and tampered with by a person wishing to reduce his utility bill. Since the meter is typically read only about once a month, the tampering may not be evident to the utility company. Another drawback to the conventional utility metering system is that local fault detection, such as the detection of a localized blackout or brown-out condition, is not possible in real-time because the utility consumption is not measured in real-time on a local scale.

Furthermore, a typical utility company is forced to maintain a very high peak-to-average usage ratio. For electrical power companies, this peak-to-average usage ratio may be on the order of 12:1, requiring the power company to maintain about twelve times as much equipment as would be required for a constant, average load. The conventional metering system does not provide any real-time way to minimize peak loading conditions. Clearly this is a very significant cost in providing utility services. Conventional attempts to control peak-to-average usage ratio include billing at a higher rate for all usage above a predetermined quantity. However, it is not currently possible in the conventional system to perform this billing increase in real-time because it is not until the meter is read that the utility company can determine the amount of usage. Likewise, there the prior art metering system does not monitor real-time loading conditions on a local scale in order to provide for more accurate usage forecasting and equipment installation planning.

In a competitive market, the utility company could also greatly benefit from the integration of other services with utility services. In a related area, "smart" homes are being designed which provide a high level of integration of consumer services such as telephone, cable television, computer network services, home shopping, paging, and the like. Additionally, these "smart" homes may utilize Consumer Electronic Bus (CEBus EIA/ANSI-600) technology to enable the owner to remotely control various household appliances and devices using power-line carriers over the existing power lines in the home. The purpose of CEBus technology is to allow consumer appliances and devices to work together as an integrated home or industry system. CEBus-compliant devices can share information with other CEBuscompliant devices. Among other communication media, the CEBus standard supports communication over pre-existing power line and twisted pair cabling. Power line transceivers typically use a 100 to 400 KHz spread-spectrum carrier technology, while twisted pair transceivers use a simple 10 KHz, 250 mV carrier. However, with the traditional metering system, the utility company does not have the infrastructure to take advantage of this integration.

The problems facing the utility companies in this area are similar to problems facing companies in other industries that have a need to remotely monitor, measure or control a metering device or point-of-sale. For example, mail delivery companies, such as the U.S. Postal Service or the like, generally maintain a large number of mail drop-off points. Each day, these drop off points must be checked to see if any mail has been deposited for delivery. Often times, especially in rural areas, there is no mail at the remote mailbox when the postal employee arrives to check it. The result is inefficient deployment of resources. Likewise, vending machine companies must send employees out to service remote vending machines according to a predetermined schedule, without knowing what the actual demand has been at the machine until the employee arrives. Clearly, there are many industries that face similar inefficiencies that arise from scheduled servicing of remote stations rather than event-driven demand-side management of these remote stations.

Several prior art solutions have been proposed for overcoming these efficiencies. Many of these prior art solutions involve the design and installation of new, dedicated communication systems to service the remote telemetry devices. Such prior art solutions make initial deployment of the system cost prohibitive. Other prior art solutions avoid high initial costs by using existing cellular radiotelephone systems to provide the communication link with the remote telemetry device. However, a significant drawback to these systems is their lack of capacity, preventing them from servicing large urban areas due to a potential overload of the cellular system overhead channels which would prevent normal cellular phone customers from receiving reliable service. Still other prior art solutions use unlicensed radio frequency (RF) bands to transmit their remote telemetry data, resulting in a significant loss of reliability due to interference from other unlicensed users in the same RF band.

What is needed is a remote telemetry system which avoids the disadvantages of the prior art telemetry systems by providing real-time telemetry data information in a low-cost and efficient manner, while further providing a "gateway" for providing advanced consumer services at the remote location.

SUMMARY OF THE INVENTION

The present invention is a novel and improved wireless and remote telemetry system which uses low-cost remote communication devices operating on existing wireless communication systems in order to provide real-time reading and control of remote telemetry devices. For example, in an embodiment applicable to utility service, consumption of electrical power among a population of customers such as residential homes and commercial buildings, is measured by a utility metering system having a wireless communication capability. The metering system comprises a remote metering unit which communicates with a central controller over existing wireless communication systems, such as cellular base stations, using existing communication standards.

The remote metering unit transmits various messages to the central controller according to a predetermined schedule which may be remotely set and adjusted by the central controller. The messages that the remote metering unit transmits to the central controller include utility consumption readings and fault status indications. These messages are transmitted over a shared random access channel. The central controller transmits messages to the remote metering unit over a paging channel, providing control functions such as setting the reporting interval of the remote metering units, and acknowledging receipt of messages from the remote metering unit. The remote metering unit may operate in a half-duplex mode only, thus eliminating the need for more costly components such as a duplexer which are required for full-duplex operation.

The system also may provide various advanced services such as delivering real-time rate information to the remote metering unit to shift demand during peak hours, remote notification of the building owner upon a fault condition in the utility service or metering system, and real-time control functions such as load balancing in order to minimize peak usage. The system also provides various techniques to manage the reporting load on the system during peak reporting times, such as during a widespread blackout. Furthermore, the remote metering unit may provide a gateway to advanced consumer services at the remote location.

By providing wireless and automatic metering services, the utility company may decrease costs by avoiding labor-intensive sight-reading of meters. Also, the utility company may use real-time data to monitor and adjust the load in response to surges and dips in demand. Since these variations are detected in real-time, the supply can be adjusted or the demand shifted by pricing increases during peak usage times or direct control of remote appliances, thereby reducing the peak-to-average ratio. Information collected for individual customers may be processed in real-time to generate short and long-term usage forecasts. Simultaneous readings of multiple remote metering units throughout the distribution system provides real-time location of losses, service thefts, leaks and faulty or improperly measuring meters. Accurate feedback of usage behavior may be provided to customers in billing statements in order to more accurately target and control wasteful practices and satisfy conservation goals.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
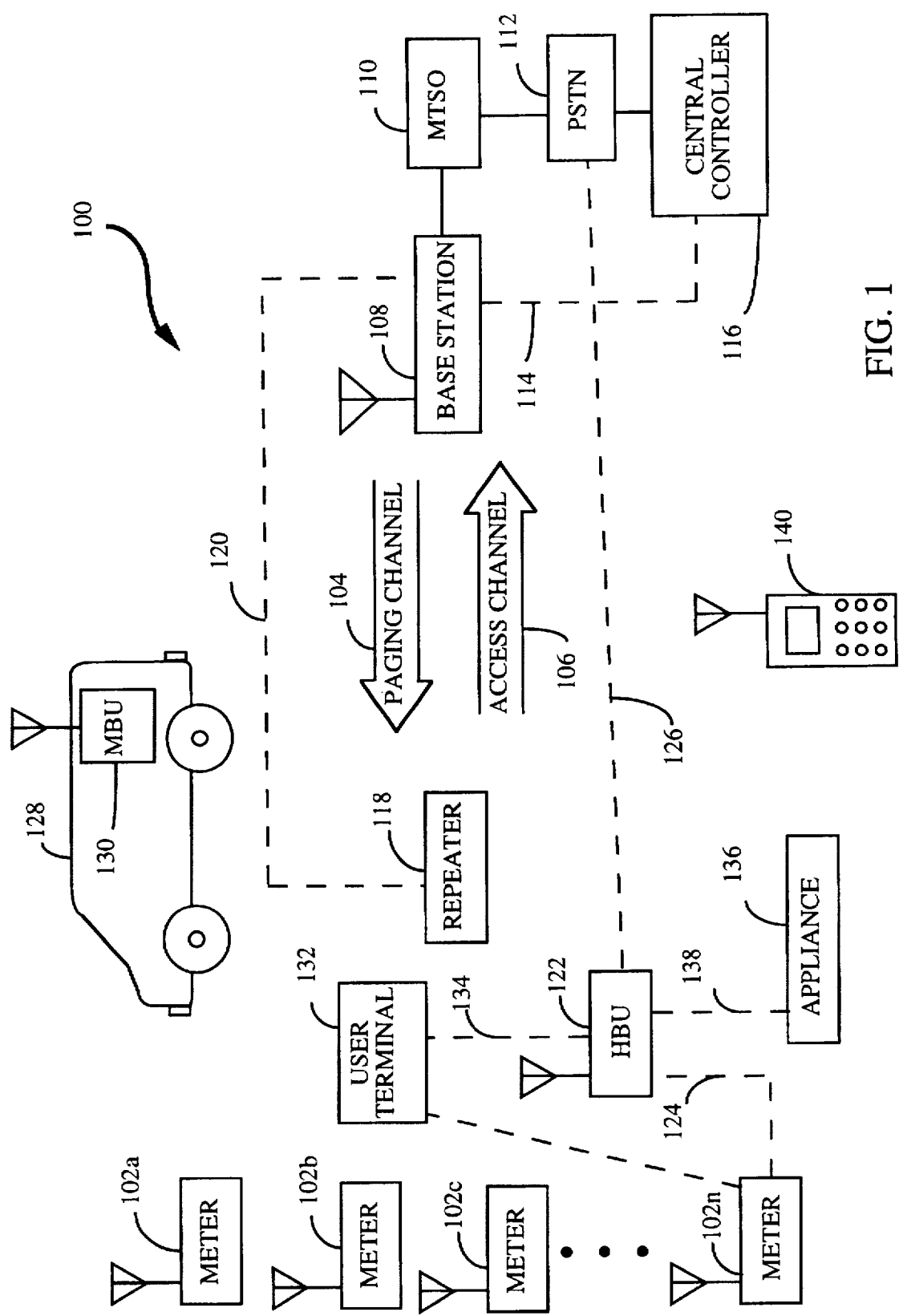
FIG. 1 is an overview of the remote telemetry system of the present invention, illustrated in block-diagram format.

FIG. 1 illustrates, in block diagram format, an overview of the remote telemetry system 100 of the present invention.

It should be noted that although the present invention will be described with respect to electrical power service, its teachings are equally applicable to other utility companies, such as water and natural gas service providers, as well as other industries as previously discussed which have a need to remotely monitor, control, or service a remote station.

A plurality of remote metering units $102a-102n$ are respectively located at strategic points throughout the utility distribution network. For example, the remote metering units $102a-102n$ would be located at residential homes and commercial buildings where the end-use of the utility service occurs, as well as key distribution points such as substations and the like where larger-scale monitoring is desired. The remote metering units $102a-102n$ may be comprised of, for example, a basic transceiver coupled to a pre-existing conventional electro-mechanical utility meter by an interface device which is adapted to the type of meter (i.e. dial or odometer type). An advantage of this construction is that a small, low-cost, and easy to manufacture device may be readily adapted to be installed on pre-existing meters without costly system upgrading. Such a remote metering unit is described below with reference to FIG. 2.

In alternate embodiments, the remote metering units $102a-102n$ are integral units which combine the utility measurement and communication circuits into a single device. An advantage of the integral construction design is reduced size and weight of the entire unit, making it more cost-effective and attractive for installation in newly constructed buildings, particularly if it is CEBus-compliant.

In the preferred embodiment, the remote metering units $102a-102n$ each perform basic metering functions including reporting of utility service consumption, meter tampering detection and reporting, utility outage reporting, and detection and reporting of "surges" and "dips" in service levels. The remote metering units $102a-102n$ each transmit their reporting messages to central controller 116 by using a conventional wireless communication system comprising at least one base station 108 and a mobile telephone switching office (MTSO) 110, which interfaces with the public switched telephone network (PSTN) 112. Central controller 116 may comprise, for example, a network-capable computer and associated memory databases and interface circuitry running application specific software for performing the control functions described herein. In various embodiments to be described below, various intermediate steps or "hops" may be interposed between the remote metering units $102a-102n$ and the central controller 116 including a wireless repeater 118, a home base unit 122, or a mobile base unit 130. Each of these various embodiments may co-exist in the same large-scale system.

In the preferred embodiment, base station 108 and MTSO 110 belong to a Code-Division Multiple Access (CDMA) spread spectrum communication system. An example of such a system is given in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS," assigned to the assignee of the present invention, and incorporated herein by reference. Additionally, the wireless communication system may be designed in accordance with Telecommunications Industry Association (TIA)/Electronic Industries Association (EIA) Interim Standard 95 (IS-95) entitled "Mobile Station-Base Station Compatibility Standard for Dual-Mode Wideband Spread Spectrum Cellular System." Alternatively, the wireless communication system may be designed in accordance with ANSI J-STD-008, entitled "Personal Station Base Station Compatibility Requirements for 1.8 to 2.0

GHz Code Division Multiple Access (CDMA) Personal Communications Systems." However, it should be noted that the teachings of the present invention are applicable to other wireless communication systems whether cellular or non-cellular, and regardless of the modulation scheme employed. For example, the present invention is equally applicable to Time-Division Multiple Access (TDMA) based systems such as the U.S. TDMA standard IS-54, or the pan-European standard Global System for Mobile Communications (GSM). Additionally, the teachings of the present invention are applicable to analog frequency modulation communication systems, such as the Advanced Mobile Phone System (AMPS).

In a first embodiment based on one of the previously mentioned CDMA standards, the remote metering units 102a–102n transmit their respective reporting messages to a respective remote communication unit located at the customer site. The remote communication unit may be for example, a wireless subscriber terminal or a specially designed mini-base station. For example, remote metering unit 102n of FIG. 1 is shown communicating with home base unit (HBU) 122 over communication link 124. In this first embodiment, link 124 is an electrical power line capable of employing power-line carrier (PLC) modulation, and both remote monitoring unit 102n and HBU 122 employ PLC transceivers. Alternately, link 124 may be an RF link over a licensed or unlicensed RF band, in which case both remote metering unit 102n and HBU 122 would employ RF transceivers. An advantage to using an RF interface for link 124 is that the transmitting power, and thus the cost, of remote metering unit 102n is small due to the relatively short distance between remote metering unit 102n and HBU 122. However, a drawback to the unlicensed approach is that the unlicensed band is susceptible to unregulated interference from other RF emitters, such as microwave ovens.

In this first embodiment, HBU 122 preferably collects and transmits the reporting messages generated by remote metering unit 102n to base station 108 over access channel 106. The access channel 106 is a random access CDMA channel which nominally provides for call originations, responses to pages, orders, and registrations for conventional subscriber stations 140 such as cellular radiotelephones. Conversely, control messages, orders, and responses to reporting messages are transmitted from base station 108 over paging channel 104. Paging channel 104 is a CDMA channel which nominally conveys overhead, paging, order and channel assignment messages to conventional subscriber stations 140 such as cellular radiotelephones. In this first embodiment, HBU 122 receives the control messages, orders, and responses to reporting messages from base station 108 over paging channel 104, and relays them to remote metering unit 102n for action as required. However, it should be noted that in alternate embodiments, HBU 122 may utilize a pre-installed land-line communication link 126 directly to the PSTN in order to communicate with central controller 116. This alternate embodiment would have the advantage of reduced cost of communication if a pre-existing land-line communication link 126 already existed at the remote station.

In this first embodiment, HBU 122 may include an integrated RS-232 serial port, or CEBus transceiver, or the like for interface to a user terminal 132 such as a personal computer or a fax machine. Thus, HBU 122 would serve as an interface for the customer to receive and display information sent over paging channel 104 to HBU 122. For example, real-time billing data, account status inquiries and various other value-added services such as advertising services could be displayed by the customer at user terminal 132. During peak utility usage hours, real-time pricing information could be communicated from central controller 116 to the customer at user terminal 122, prompting the customer to reduce his power consumption by turning off various non-critical electrical equipment. Furthermore, user terminal 132 may provide for interactive consumer services such as home-shopping, travel reservations, concert ticket sales, and the like.

For example, a customer desiring to purchase airline ticket reservations may enter the appropriate information at user terminal 132 which is running application specific software for remote airline purchases. The user terminal 132 generates a purchase message which is encoded, modulated and transmitted by HBU 122 over access channel 106 to base station 108. The purchase message is routed by MTSO 110 and PSTN 112 to central controller 116 where appropriate action is taken (i.e. reservation of the tickets, debiting of the customer's checking account, etc.). A confirmation message is then generated by central controller 116 which is routed by PSTN 112 and MTSO 110 to base station 108. Base station 108 then encodes, modulates, and transmits the confirmation message over paging channel 104. The confirmation message is received by HBU 122, and passed to user terminal 132 for display to the customer.

Additionally, HBU 122 may have an application interface that allows remote scheduling of automatic meter readings, automatic billing information transfer, and the like, based on control messages sent from central controller 116. In alternate embodiments, remote metering unit 102n may itself have a direct interface with user terminal 132, whether it be RS-232, or PLC or another interface technology as is known in the art.

HBU 122 may also serve as a "gateway" for other services relating to home-integration and utility load management. For example, consider CEBus-compliant appliance 136 connected to HBU 122 via PLC interface 138. Appliance 136 may be a lighting fixture, heating/air conditioning unit, security system, or home entertainment system for example. During peak hours, central controller 116 could send control messages to appliance 136, or a group of appliances on a common bus, to turn off, thus reducing real-time power loading. Also, a customer could remotely activate and deactivate appliance 136 by sending control messages from conventional subscriber station 140 to appliance 136 via base station 108 and HBU 122.

In a second embodiment of the present invention, a localized group of remote metering units, for example 102a–102c, may comprise a low-power CDMA transceiver such as that described with reference to the first embodiment. However, instead of the HBU 122 providing the intermediate "hop" to base station 108, a CDMA repeater 118 would relay RF signals over access channel 106 from remote metering units 102a–102c to base station 108, and also relay RF signals over paging channel 104 from base station 108 to remote metering units 102a–102c. CDMA repeater 118 would comprise, for example, a high-power amplifier and associated transponding circuitry as is known in the art. CDMA repeater 118 could be located, for example, at the top of a utility pole, or on a rooftop where it had sufficient line-of-sight communication with both remote metering units 102a–102n and base station 108.

An advantage of using CDMA repeater 118 to relay messages back and forth between remote metering units 102a–102c and base station 108 is that the RF power output of remote metering units 102a–102c, and consequently their cost, would be reduced significantly over embodiments where remote metering units 102a–102c must each transmit enough power to contact base station 108 directly over access channel 106. Although remote metering units 102a–102c would be on the order of 500 feet to 1,000 feet from CDMA repeater 118, the repeater 118 itself could be on the order of six or seven miles from the nearest base station 108. Additionally, CDMA repeater 118 is much less complex and less expensive to manufacture, install and maintaing than base station 108. Thus, the effective coverage area of base station 108 may be extended by CDMA repeater 118 without the need for additional base stations.

To provide the "gateway" of demand-side services referred to above in the discussion of the first embodiment, the PLC interface may be located inside remote metering units 102a–102c themselves as will be discussed further with reference to FIG. 2. As previously noted, this second embodiment may be used in combination with any of the other embodiments discussed herein. Additionally, it should be noted that CDMA repeater 118 could utilize a wireline backhaul interface to base station 108 such as fiber optic lines or the like, depending on the nature of the installation site, and availability of wireline resources near the installation site. Such a fiber-optic outfitted repeater 118 would include the same RF link to the remote metering units 102a–102n as was discussed above, but would have a fiber optic link backhaul to the base station 108.

In a third embodiment of the present invention, remote metering units 102a–102n communicate directly with base station 108 over access channel 106, and receive messages from base station 108 over paging channel 104. In this third embodiment, remote metering units 102a–102n would require a higher-power transceiver than that used for the first and second embodiments. However, initial installation and retrofitting of existing meters would be easier because HBU 122 and CDMA repeater 118 would not be needed. As in the second embodiment, the PLC gateway for value-added services would be located in the respective remote metering units 102a–102n.

In a fourth embodiment of the present invention, a mobile base unit (MBU) 130 may be located in a vehicle 128 and driven to within communication range of remote metering units 102a–102n. This fourth embodiment may be used to augment coverage in rural areas that do not yet have wireless communication services installed. This fourth embodiment utilizes the same low-power CDMA RF transceiver in remote metering units 102a–102n as was described above in reference to the first and second embodiments. Additionally, MBU 130 is functionally very similar to HBU 122 as described above in that it collects and transmits messages from remote metering units 102a–102n, except that it is configured for mobile operations, and thus is not in continuous communication with remote metering units 102a–102n. MBU 130 may also comprise a separate computer (not shown) for data storage and post-processing instead of immediate transmission to base station 108. In this fourth embodiment, since MBU 130 is not in continuous communication with remote metering units 102a–102n, MBU 130 interrogates each remote metering unit 102a–102n as it drives by, receiving replies for storage and later post-processing.

In each of the above described embodiments, multiple remote metering units 102a–102n may simultaneously attempt to send a message on access channel 106, either alone or through their respective intermediate "hops" (i.e. HBU 122, or repeater 118), at the same time that other conventional subscriber units 140 are also attempting to communicate with base station 108 over access channel 106. Thus, techniques for avoiding "collisions" between competing remote metering units 102a–102n are provided. For example, a transmitting remote metering unit 102a–102n randomly chooses a pseudo-noise (PN) time alignment from the set of available PN time alignments. Thus, unless two or more remote metering units 102a–102n or other remote subscriber stations choose the same PN time alignment, the base station 108 will be able to receive their simultaneous transmissions. The base station 108 also controls the rate of access channel 106 transmissions to prevent too many simultaneous transmissions by multiple subscriber stations. Too many simultaneous transmissions would exhaust the available capacity of the access channel 106 and ultimately exhaust the available base station 108 processing resources. Normal control of access channel 106 transmissions is accomplished through parameters contained in an Access Parameters Message, broadcast from base station 108 on paging channel 104.

A further technique for preventing system overload due to too many simultaneous users is active scheduling of the remote metering units 102a–102n reporting times by central controller 116. Central controller 116 generates scheduling messages for delivery to each remote metering unit 102a–102n. In the preferred embodiment, these scheduling messages are routed from PSTN 112 through MTSO 110 to base station 108 where they are transmitted over paging channel 104. Examples of scheduling messages would be a broadcast instruction for each remote metering unit 102a–102n to transmit their respective reporting messages at a randomly selected time, once per hour. Another example of a scheduling message would be a specific interrogation of a specific remote metering unit 102a, for example, to set a baseline for the commencement of utility services, or the closing of an account. A further type of collision avoidance scheme may be employed when a catastrophe such as a blackout condition occurs, and thus many thousand remote metering units 102a–102n each simultaneously want to transmit a fault status indication message to central controller 116. In such a catastrophe, central controller 116 may send out a broadcast message via base station 108 directing only certain strategically located remote metering units 102a–102n to report, or to distribute their reporting messages over time by hashing.

In alternate embodiments, a paging channel 104 and an access channel 106 may be constructed that are optimized for short message transmissions by a large population of remote metering units 102a–102n. Such a system is described in co-pending U.S. pat. application Ser. No. 08/412,648, filed May 17, 1995, entitled "RANDOM ACCESS COMMUNICATIONS DATA CHANNEL FOR DATA SERVICES," assigned to the assignee of the present invention and incorporated herein by reference. In the just mentioned patent, each of the remote subscriber stations, here the remote metering units 102a–102n, uses a unique PN spreading code and makes packet service requests on the random access channel 106. In response to the packet service request, the base station 108 assigns a free searcher receiver (not shown) to the requesting station and acknowledges the request on the paging channel 104. The remote subscriber station then sends the data packet on the random access channel 106 where it is discriminated by the searcher receiver, and demodulated. If the bandwidth demand of the remote subscriber station exceeds a certain threshold (i.e. the length of the data packet exceeds a certain threshold), the base station 108 would send a control message over the paging channel 104 to assign the remote subscriber station to a dedicated traffic channel (not shown) for transmission of the data packet.

Additionally, in this alternate embodiment, closed-loop power control commands are sent to the remote subscriber units over the paging channel 104 to ensure that all transmissions arrive at the base station 108 with the same average power. For example, the base station 108 may perform closed-loop power control in accordance with the techniques described in U.S. Pat. No. 5,257,283, issued Oct. 26, 1993, entitled "SPREAD SPECTRUM TRANSMITTER POWER CONTROL METHOD AND SYSTEM," assigned to the assignee of the present invention and incorporated herein by reference. This alternate embodiment is particularly suited for sharing communication channel resources among a large number of "bursty" packet data users, each having a variable and unpredictable demand for base station 108 resources. Clearly there are many different possible constructions for paging channel 104 and access channel 106.

In the preferred embodiment, remote metering units 102a–102n operate in half-duplex mode. That is to say that the remote metering units 102a–102n do not receive messages over paging channel 104 from the base station 108 at the same time that they are transmitting messages to base station 108 over access channel 106. Furthermore, in the preferred embodiment, the paging channel 104 operates in "slotted" mode. In this mode, messages addressed to a particular remote subscriber station, here the remote metering units 102a–102n, are sent only in pre-defined time slots. Through the registration process, a remote subscriber station indicates to base station 108 in which slots it will be "listening" to paging channel 104 for messages addressed to it. Thus, in the preferred embodiment, remote metering units 102a–102n may operate in half-duplex mode without missing any incoming messages on paging channel 104 by transmitting reporting messages on access channel 106 only during times other than their respective assigned slots on the paging channel 104. By utilizing half-duplex mode operation, the remote metering units 102a–102n may be manufactured much more inexpensively because they avoid the need for a duplexer and allow possible sharing of a single frequency synthesizer for both transmit and receive paths.

Figure 2:
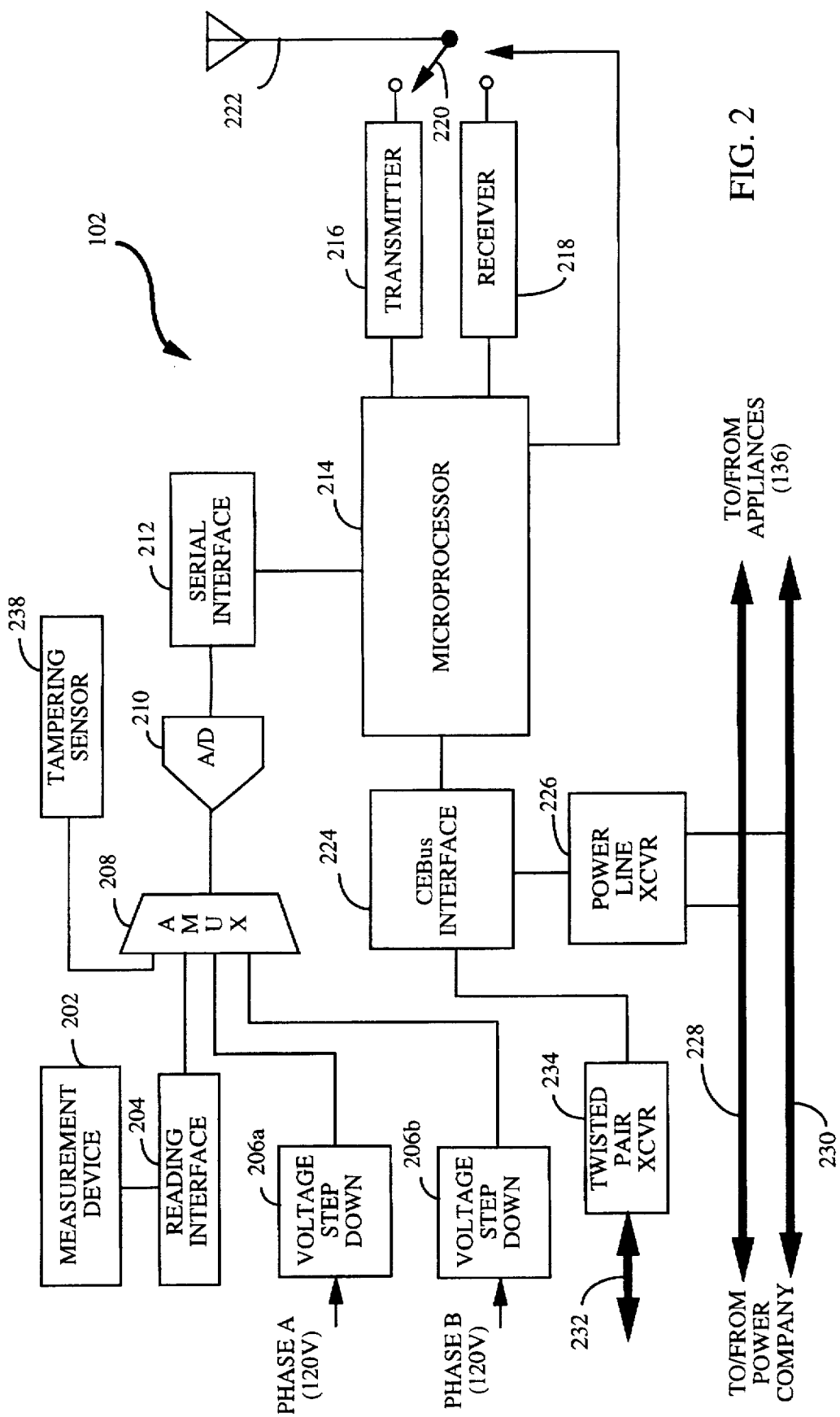
FIG. 2 is a block-diagram of an exemplary remote metering unit of the present invention.

Referring now to FIG. 2, an exemplary remote metering unit 102 is illustrated. In an embodiment applicable to electrical utility meter reading, measurement device 202 may be an electro-mechanical power consumption monitor and display of the rotating disk or odometer types as are known in the art. Reading interface 204 may then be an optical or electro-mechanical interface adapted to the type of measurement device 202 employed. For example, if measurement device 202 is an electro-mechanical rotating disk, then the number of revolutions of the disk is indicative of the power consumption. In such a case, reading interface 204 may comprise a light source and photocell that reads a single light pulse for every revolution of the disk. Reading interface 204 transforms the light pulses to analog electrical pulses and transmits them to analog multiplexer (AMUX) 208, where they are passed to analog-to-digital converter (A/D) 210. A/D converts the analog electrical pulses to a digital signal representative of the number of revolutions counted by reading interface 204, and passes the resulting digital signal to microprocessor 214. In response to the digital signal, microprocessor 214 calculates and stores the total consumption in kilowatt hours. In the preferred embodiment, the storage interval may be selectable from about one-half hour to about one month.

Periodically, according to a reporting schedule that may either be programmed locally or downloaded over paging channel 104 from central controller 116 (see FIG. 1), microprocessor 214 generates a utility consumption message for transmission on access channel 106. The consumption message is formatted by microprocessor 214 and then upconverted, modulated, amplified, and transmitted by transmitter 216 over antenna 222. Note that in the preferred embodiment, microprocessor 214 configures switch 220 for transmission only during times other than the assigned paging slot on paging channel 104, thereby enabling remote metering unit 102 to operate half-duplex without missing incoming messages from central controller 116. Alternately, switch 220 may be replaced by a conventional duplexer as is known in the art if half-duplex operation is not desired.

Control or feedback messages intended for remote metering unit 102 are transmitted by central controller 116 as previously discussed. These messages are captured by antenna 222, downconverted and demodulated by receiver 218 and passed to microprocessor 214 for appropriate action. Note that microprocessor 214 configures switch 220 for reception unless an outgoing transmission is required. The control messages sent by central controller 116 may include scheduling messages and acknowledgment of receipt of the various reporting messages transmitted by remote metering unit 102.

Additionally, in the exemplary embodiment of FIG. 2, voltage step-down transformers 206a and 206b are respectively coupled to the phase A and phase B electrical power lines at the customer site. In a typical electrical power installation in a residential home in the United States, the voltage level of both phase A and phase B is 120 volts. Step-down transformers 206a and 206b each output an analog voltage level signal that is proportional to the voltage sensed on phase A and phase B, respectively. The analog voltage level signals are passed to A/D 210 by AMUX 208, where they are subsequently converted to digital voltage level signals. The digital voltage level signals are then passed to microprocessor 214 through serial interface 212, where they are respectively compared with a maximum and a minimum voltage level threshold. In the preferred embodiment, the maximum and minimum voltage level thresholds are programmable, and may be enabled or disabled via control messages from central controller 116, as required.

If the digital voltage level signal representing the voltage sensed on phase A, and the digital voltage level signal representing the voltage sensed on phase B are both between the maximum and minimum voltage level thresholds, then the voltage level regulation of phase A and phase B is satisfactory, and no action is taken. However, if either the digital voltage level signal representing the voltage sensed on phase A, or the digital voltage level signal representing the voltage sensed on phase B is not between the maximum and minimum voltage level thresholds, then the voltage level regulation of phase A and phase B is unsatisfactory, and microprocessor 214 generates a fault condition message for transmission to central controller 116 (see FIG. 1). Such a fault condition would occur if there were excessive "surges" or "dips" in the voltage level sensed on phase A or phase B, including if there were a local blackout or brownout. The fault condition message may contain an encoded representation of the actual voltage sensed on phase A and phase B.

Microprocessor 214 may generate the fault condition message for immediate transmission to central controller 116, or store the digital voltage level signal for delayed reporting. The delayed reporting feature may be used in conjunction with the broadcast message previously discussed in the case of a blackout, where thousands of remote metering units 102 would be experiencing the same fault condition, and thus access channel 106 would have to be carefully managed to avoid exceeding system capacity. Furthermore, central controller 116 may periodically interrogate remote metering unit 102 and direct it to report not only the present consumption reading, but also the present voltage levels sensed on both phase A and phase B.

Additionally, in the exemplary embodiment of FIG. 2, a tampering sensor 238 generates an analog tampering signal upon any attempted alteration or disconnection of remote metering unit 102. Tampering sensor 238 may be, for example, a mercury switch, or a proximity switch as is known in the art. This is desired in a utility metering application since tampering with the meter in order to "steal" utility service is very common. Since no person will be regularly visiting the remote metering unit 102 for visual inspection, the tampering sensor 238 is a security feature that enables remote detection of theft. The analog tampering signal is passed to A/D 210 through AMUX 208, where it is subsequently converted to a digital tampering signal. The digital tampering signal is passed to microprocessor 214 through serial interface 212. Microprocessor 214 may generate an fault condition message for immediate transmission to central controller 116, or it may provide for memory storage of the digital tampering signal for delayed reporting. In case remote metering unit 102 is disconnected, the digital tampering signal is stored in memory for later retrieval.

In the exemplary embodiment shown in FIG. 2, CEBus interface 224, power line transceiver 226, and twisted pair transceiver 234 are shown as being an integral part of remote metering unit 102. However, it should be noted that these "gateway" devices may be located at HBU 122 (see FIG. 1). Additionally, it should be noted that whether twisted pair transceiver 234 or power line transceiver 226 are located integrally to remote metering unit 102, or whether they would be present at all, may depend on the nature and configuration of the installation site. Also, it should be noted that although the CEBus interface 224, power line transceiver 226 and twisted pair transceiver 234 are shown as physically separate blocks in FIG. 2, they may be integrated into a single Very-Large Scale Integration (VLSI) Application Specific Integrated Circuit (ASIC), and even combined into microprocessor 214. VLSI ASIC techniques are well known in the art.

In the preferred embodiment, CEBus interface 224 comprises a flash EPROM programmed with the specific application code required to run the various advanced services described herein. Additionally, CEBus interface 224 comprises non-volatile memory for storing CEBus system configuration parameters. Finally, CEBus interface 224 comprises the required circuitry for interfacing with microprocessor 214 and both power line transceiver 226 and twisted pair transceiver 234. For example, CEBus interface 224 may further comprise an embedded UART (not shown) for transmitting at higher data rates over twisted pair transceiver 234. CEBus controllers and interfaces are well known in the art. Power line transceiver 226 and twisted pair transceiver 234 each comprise the necessary circuitry to perform carrier modulation. This may include amplifiers, receivers, transformers, and various passive elements. Power line and twisted pair transceivers are also well known in the art.

In operation, control or informational messages originating in central controller 116, or alternately conventional subscriber station 140, are received by receiver 218, and passed to microprocessor 214 where they are subsequently routed to CEBus interface 224. In response to the control or informational messages, CEBus interface 224 generates PLC encoded messages for transmission by either twisted pair transceiver 234 or power line transceiver 226, or both. The PLC encoded messages are transmitted on power lines 228 and 230 respectively, or on twisted pair line 232. CEBus-compliant appliance 136 receives the PLC encoded messages, decodes them, and takes appropriate action.

For example, referring back to FIG. 1, appliance 136 may be a thermostat which controls a heating/air-conditioning unit. Central controller 116 may sense that the overall peak load on the local grid to which remote metering unit 102n belongs is exceeding a predetermined threshold. In response, central controller 116 may generate a control message instructing various equipment in the local grid to shed a portion of their load. The control message may be routed by PSTN 112 and MTSO 110 to base station 108. In response, base station 108 may transmit a signaling message intended for remote metering unit 102n over paging channel 104. Referring now to FIG. 2, the signaling message may be received by receiver 218, and passed by microprocessor 214 to CEBus interface 224. In response, CEBus interface 224 may then generate a PLC encoded message for transmission on power lines 228 and 230 to appliance 136 (the thermostat). In response to the PLC encoded message, the thermostat would adjust its settings to reduce the power load, for example by turning off the heating/air-conditioning unit. A similar process would be followed for any CEBus-compliant appliance 136 at the customer site. In this manner, the utility company may provide for active load management functions, thereby reducing their peak-to-average ratio. Furthermore, the same process may be used to easily accomplish restoration of power service (i.e. connecting and disconnecting of electricity service) as long as power relay switches (not shown) are installed at the customer site and are CEBus-compliant.

Additionally, any CEBus-compliant appliance 136 may share information about its own operational state. For example, suppose appliance 136 is a home security system having a controller. Upon a breach of the home security system, the home security system controller generates an alarm message, and PLC encodes it over power lines 228 and 230. Power line transceiver 226 receives the alarm message, and passes it to CEBus interface 224, which decodes it and passes it to microprocessor 214. In response, microprocessor 214 generates an appropriate alarm status message which is subsequently transmitted by transmitter 216, over access channel 106 (see FIG. 1) to base station 108. The alarm status message may then be routed to central controller 116 by MTSO 110 and PSTN 112 where appropriate security personnel may be notified to respond.

The format of the various messages sent over paging channel 104 and access channel 106 will now be discussed with reference to a system 100 which is compliant with J-STD-008. Again, it should be noted that the teachings of the present invention are equally applicable to other standards. In the preferred embodiment of the present invention, the various reporting messages transmitted by remote metering units 102a–102n over access channel 106 use the format of the Data Burst Message of ANSI J-STD-008 paragraph 2.7.1.3.2.3. The Data Burst Message is a variable length message suitable for the formatting of short messages. The format of a Data Burst Message is given below in reference to TABLE I:

TABLE I

| Access Channel Data Burst Message Format | |
|---|---|
| Field | Length (Bits) |
| MSG_TYPE | 8 |
| ACK_SEQ | 3 |
| MSG_SEQ | 3 |
| ACK_REQ | 1 |
| VALID_ACK | 1 |
| ACK_TYPE | 3 |
| MSID_TYPE | 3 |
| MSID_LEN | 4 |
| MSID | 8 X MSID_LEN |
| AUTH_MODE | 2 |
| AUTHR | 0 OR 18 |
| RANDC | 0 OR 8 |
| COUNT | 0 OR 6 |
| MSG_NUMBER | 8 |
| BURST_TYPE | 6 |
| NUM_MSGS | 8 |
| NUM_FIELDS | 8 |
| CHARi | 8 | where:

MSG_TYPE is the message type. For the Data Burst Message, the message type is '00000011'.

ACK_SEQ is the acknowledgment sequence number. The remote metering unit 102 shall set this field to the value of the MSG_SEQ field from the most recently received Paging Channel message requiring acknowledgment. If no such message has been received, the remote metering unit shall set this field to '111'.

ACK_REQ is the acknowledgment required indicator. This field indicates whether this message requires an acknowledgment. The remote metering unit 102 shall set the ACK_REQ field of all messages on access channel 106 to '1'.

VALID_ACK is the valid acknowledgment indicator. To acknowledge a paging channel 104 message, the remote metering unit 102 shall set this field to '1'. Otherwise the remote metering unit shall set this field to '0'.

ACK_TYPE is the acknowledgment address type. The remote metering unit 102 shall set this field to the value of the ADDR_TYPE field, if present, from the most recently received paging channel 104 message requiring acknowledgment. Otherwise, the remote metering unit 102 shall set this field to '000'.

MSID_TYPE is the personal station identifier field type. The remote metering unit 102 shall set this field in accordance with the type of identifier being used (i.e. ESN, IMSI, TMSI, etc.)

MSID_LEN is the personal station identifier field length. The remote metering unit 102 shall set this field to the number of octets included in the MSID field.

MSID is the personal station identifier. The remote metering unit 102 shall set this field to the personal station identifier, using the identifier type specified in the MSID_TYPE field.

AUTH_MODE is the authentication mode. If authentication information is not available, or if base station 108 has indicated that authentication is not required, the remote metering unit 102 shall set this field to '00'. If authentication is required by the base station and authentication information is available, the remote metering unit 102 shall set this field to '01'.

AUTHR is the authentication data. If the AUTH_MODE field is set to '00' this field shall be omitted.

RANDC is the random challenge value. If the AUTH_MODE field is set to '00' this field shall be omitted.

COUNT is the call history parameter. If the AUTH_MODE field is set to '00' this field shall be omitted.

MSG_NUMBER is the message number within the data burst stream. The remote metering unit 102 shall set this field to the number of this message within the data burst stream.

BURST_TYPE is the data burst type, and is set according to the value shown in TSB-58, entitled "Administration of Parameter Value Assignments for TIA/EIA Wideband Spread Spectrum Standards" for the type of this data burst.

NUM_MSGS is the number of messages in this data burst stream.

NUM_FIELDS is the number of characters in this message.

CHARi is a character. The remote metering unit 102 shall include NUM_FIELDS occurrences of this field. The remote metering unit 102 shall set these fields to the corresponding octet of the data burst stream.

Alternate embodiments use different message formats to carry the reporting messages generated by remote metering unit 102. For example, the Origination Message of ANSI J-STD-008 may be used with the message data contained in the CHARi (dialed digit or character) field.

In the preferred embodiment, for control messages sent by base station 108 over paging channel 104, the Data Burst Message format of ANSI J-STD-008 paragraph 3.7.2.3.2.9 is used. The Data Burst Message is a variable length message format suitable for short messages. The format of the Data Burst Message is described below with reference to TABLE II:

TABLE II

| Paging Channel Data Burst Message Format | |
|---|---|
| Field | Length (Bits) |
| MSG_TYPE | 8 |
| ACK_SEQ | 3 |
| MSG_SEQ | 3 |
| ACK_REQ | 1 |
| VALID_ACK | 1 |
| ADDR_TYPE | 3 |
| ADDR_LEN | 4 |
| ADDRESS | 8 x ADDR_LEN |
| MSG_NUMBER | 8 |
| BURST_TYPE | 6 |
| NUM_MSGS | 8 |
| NUM_FIELDS | 8 |
| CHARi | 8 | where:

MSG_TYPE is the message type. For the Paging Channel Data Burst Message, the message type is '00001001'.

ACK_SEQ is the acknowledgment sequence number. The base station 108 shall set this field to the MSG_SEQ field from the most recently received Access Channel 106 message requiring an acknowledgment from the remote metering unit 102 addressed by this message.

MSG_SEQ is the message sequence number.

ACK_REQ is the acknowledgment required indicator. The base station 108 shall set this field to '1' if the remote metering unit 102 is required to acknowledge this message. Otherwise, the base station 108 shall set this field to '0'.

VALID_ACK is the valid acknowledgment indicator. To acknowledge the most recently received access channel 106 message from remote metering unit 102, the base station 108 shall set this field to '1'. Otherwise the remote metering unit shall set this field to '0'.

ADDR_TYPE is the address type, which is set in accordance with the type of identifier being used (i.e. ESN, IMSI, TMSI, etc.).

ADDR_LEN is the address length. The base station 108 shall set this field to the number of octets included in the ADDRESS field.

ADDRESS is the personal station or broadcast address.

MSG_NUMBER is the message number within the data burst stream. The base station 108 shall set this field to the number of this message within the data burst stream.

BURST_TYPE is the data burst type, and is set according to the value shown in TSB-58, entitled "Administration of Parameter Value Assignments for TIA/EIA Wideband Spread Spectrum Standards" for the type of this data burst.

NUM_MSGS is the number of messages in this data burst stream.

NUM_FIELDS is the number of characters in this message.

CHARi is a character. The base station 108 shall include NUM_FIELDS occurrences of this field. The base station 108 shall set these fields to the corresponding octet of the data burst stream.

Thus, the present invention uses low-cost remote communication devices operating on existing wireless communication systems in order to provide real-time reading and control of remote telemetry devices, while providing advanced consumer services to customers. By providing wireless and automatic metering services, the utility company may decrease costs by avoiding labor-intensive sight-reading of meters. Also, the utility company may use real-time data to monitor and adjust the load in response to surges and dips in demand. Furthermore, by providing a "gateway" for advanced consumer services, the utility company may also take advantage of home-integration technology to perform active load management, and even interactive informational services.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A wireless remote telemetry system comprising:

a first base station having a code-division multiple access (CDMA) random access channel and a CDMA paging channel, said CDMA random access channel for carrying a plurality of reporting messages and said CDMA paging channel for carrying a plurality of control messages;

a first remote telemetry device of a plurality of remote telemetry devices, said first remote telemetry device for measuring a local parameter, and for transmitting a first of said plurality of reporting messages over said CDMA random access channel in response to said measurement, and for receiving a first of said plurality of control messages over said CDMA paging channel; and a central controller for receiving said first reporting message and for generating said plurality of control messages.

2. The system of claim 1 further comprising a remote communication unit for relaying said first control message to said first remote telemetry device and for relaying said first reporting message to said base station.

3. The system of claim 2 wherein said remote communication unit is a wireless subscriber station.

4. The system of claim 2 wherein said remote communication unit is a second CDMA base station.

5. The system of claim 2 wherein said remote communication unit is a wireless CDMA repeater.

6. The system of claim 3 further comprising a user terminal for displaying user information in response to said measurement of said local parameter and said first control message.

7. The system of claim 4 further comprising a user terminal for displaying user information in response to said measurement of said local parameter and said first control message.

8. The system of claim 6 further comprising a remote appliance, said remote appliance being adjusted in response to said first control message.

9. The system of claim 7 further comprising a remote appliance, said remote appliance being adjusted in response to said first control message.

10. A method of remote telemetering in a code-division multiple access (CDMA) communication system in which a first base station having a CDMA random access channel and a CDMA paging channel communicates with a remote telemetry device and a central controller, said CDMA random access channel for carrying a plurality of reporting messages and said CDMA paging channel for carrying a plurality of control messages, said method comprising the steps of:

measuring, at said remote telemetry device, a local parameter;

transmitting, from said remote telemetry device, a first of said plurality of reporting messages over said CDMA random access channel in response to said measurement;

receiving, in said central controller, said first reporting message;

generating, in said local controller, a first of said plurality of control messages;

transmitting said first control message over said CDMA paging channel; and receiving, in said remote telemetry device, said first control message.

11. The method of claim 10 further comprising the step of relaying said first control message to said remote telemetry device and for relaying said first reporting message to said base station.

12. The method of claim 11 further comprising the step of displaying, at a user terminal, user information in response to said measurement of said local parameter and said first control message.

13. The method of claim 12 further comprising the step of adjusting a remote appliance in response to said first control message.

14. A remote metering unit in a code-division multiple access (CDMA) communication system having at least one base station, said at least one base station having a CDMA random access channel and a CDMA paging channel, said CDMA random access channel for carrying a plurality of reporting messages and said CDMA paging channel for carrying a plurality of control messages said remote metering unit comprising:

a reading interface for generating a measurement signal in response to reading a measurement device;

a microprocessor for generating a first of said plurality of reporting messages in response to said measurement signal; and a CDMA transmitter for transmitting said first reporting message over said CDMA random access channel.

15. The remote metering unit of claim 14 further comprising:

a tampering sensor for generating a tampering signal; and a multiplexer for multiplexing said tampering signal with said measurement signal, said microprocessor further for generating a second of said plurality of reporting messages in response to said tampering signal, and said CDMA transmitter further for transmitting said second reporting message over said CDMA random access channel.

16. The remote metering unit of claim 15 wherein said remote metering unit is coupled to at least one electrical power line, said remote metering unit further comprising at least one step down transformer for generating a voltage-level signal in response to a voltage level of said at least one electrical power line, said multiplexer further for multiplexing said voltage-level signal with said tampering signal and said measurement signal, said microprocessor further for generating a third of said plurality of reporting messages in response to said voltage-level signal, and said CDMA transmitter further for transmitting said third reporting message over said CDMA random access channel.

17. The remote metering unit of claim 14 further comprising:

a CDMA receiver for receiving a control message over said CDMA paging channel;

a power-line carrier interface for translating said received control message into a power-line carrier control signal; and at least one power-line transceiver for transmitting said power-line carrier control signal over said at least one electrical power line.

18. The remote metering unit of claim 14 further comprising:

an antenna;

a CDMA receiver for receiving a first of said plurality of control messages over said CDMA paging channel;

a switch for alternately coupling said CDMA transmitter or said CDMA receiver to said antenna.

19. The remote metering unit of claim 18 wherein said CDMA paging channel operates in a slotted mode, and wherein said switch couples said CDMA transmitter to said antenna only during times not associated with an assigned paging slot of said remote metering unit.

* * * * *